US012590647B2

(12) United States Patent
Gilley et al.

(10) Patent No.: US 12,590,647 B2
(45) **Date of Patent: \*Mar. 31, 2026**

(54) METHOD AND APPARATUS FOR VALVE CORE INSTALLATION/REMOVAL

(71) Applicant: Fieldpiece Instruments, Inc., Orange, CA (US)

(72) Inventors: Jason Corbett Gilley, Orange, CA (US); Henry J. Kuo, Yorba Linda, CA (US)

(73) Assignee: Fieldpiece Instruments, Inc., Orange, CA (US)

( \* ) Notice: Subject to any disclaimer, the term of this patent is extended or adjusted under 35 U.S.C. 154(b) by 150 days.

This patent is subject to a terminal disclaimer.

(21) Appl. No.: 18/528,637

(22) Filed: Dec. 4, 2023

(65) Prior Publication Data

US 2024/0229971 A1 Jul. 11, 2024

Related U.S. Application Data

(63) Continuation-in-part of application No. 18/507,977, filed on Nov. 13, 2023, now Pat. No. 12,110,989, which is a continuation of application No. 18/093,712, filed on Jan. 5, 2023, now Pat. No. 11,879,565.

(51) Int. Cl.
*F16K 43/00* (2006.01)

(52) U.S. Cl.
CPC ...... *F16K 43/003* (2013.01); *F25B 2345/006* (2013.01)

(58) Field of Classification Search
CPC .......................... F16K 43/003; F25B 2345/006
See application file for complete search history.

(56) References Cited

U.S. PATENT DOCUMENTS

| | | | | |
|---|---|---|---|---|
| 3,840,967 A | * | 10/1974 | Olson | F25B 45/00 137/328 |
| 3,935,713 A | * | 2/1976 | Olson | B25B 27/24 62/77 |
| 6,901,947 B2 | * | 6/2005 | Danielson | F16L 37/23 29/221.6 |
| 7,559,245 B2 | * | 7/2009 | Knowles | F25B 45/00 73/741 |
| 10,478,953 B2 | * | 11/2019 | Green | B25B 27/24 |
| 11,879,565 B1 | * | 1/2024 | Kuo | F16K 43/003 |
| 12,110,989 B2 | * | 10/2024 | Kuo | F16K 43/003 |

* cited by examiner

*Primary Examiner* — Michael R Reid
(74) *Attorney, Agent, or Firm* — Paul J. Backofen, Esq.

(57) ABSTRACT

A valve core installation/removal tee enable the removal and or replacement of a Schrader® valve insert without evacuating the refrigeration system. The use of a valve core installation/removal tee also permits the valve core to be removed and maintenance of the HVAC system to be performed without the flow restriction of the valve core and core depressor.

7 Claims, 10 Drawing Sheets

Fig. 1A (Prior Art)
Fig. 2
Fig. 1B (Prior Art)
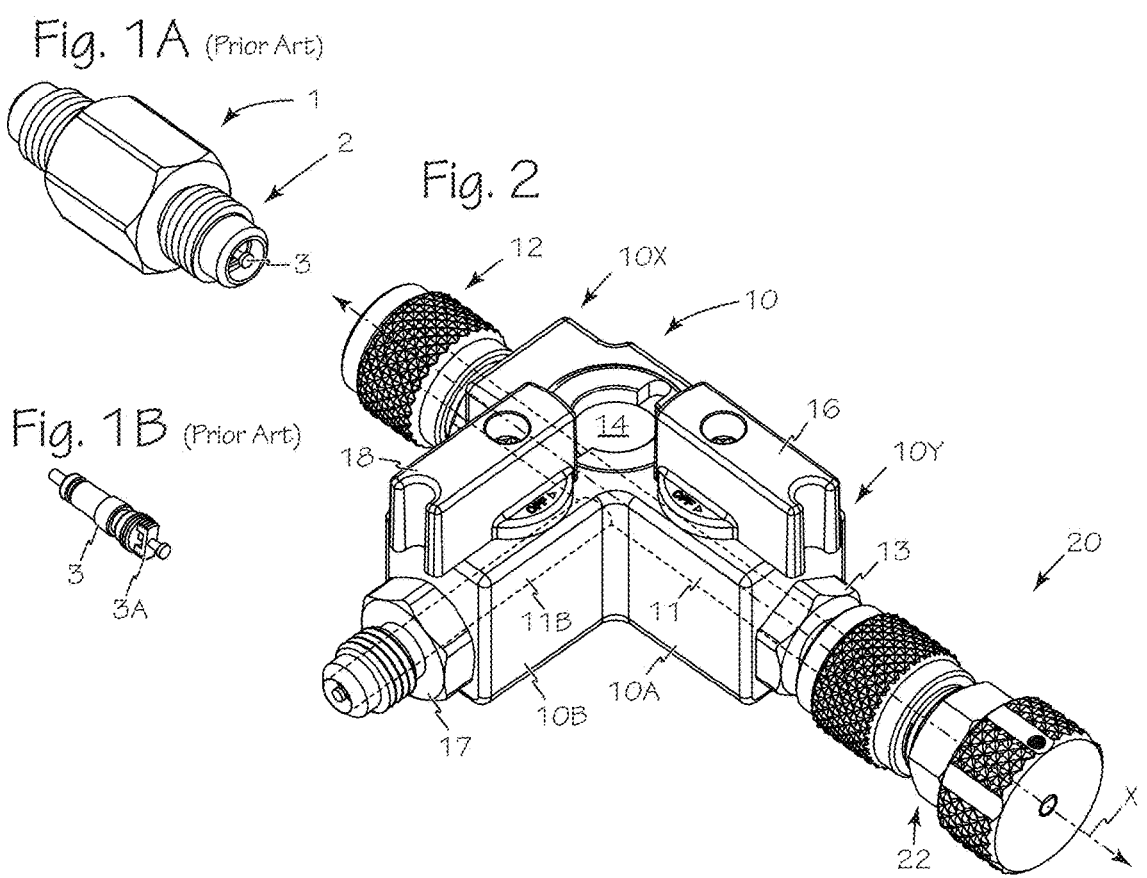
Fig. 3
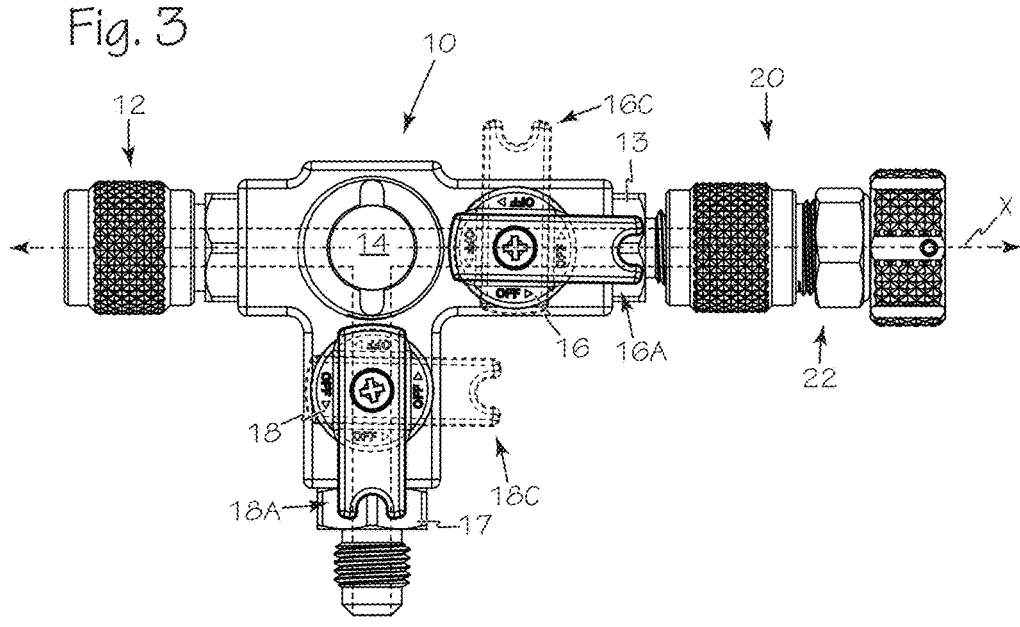

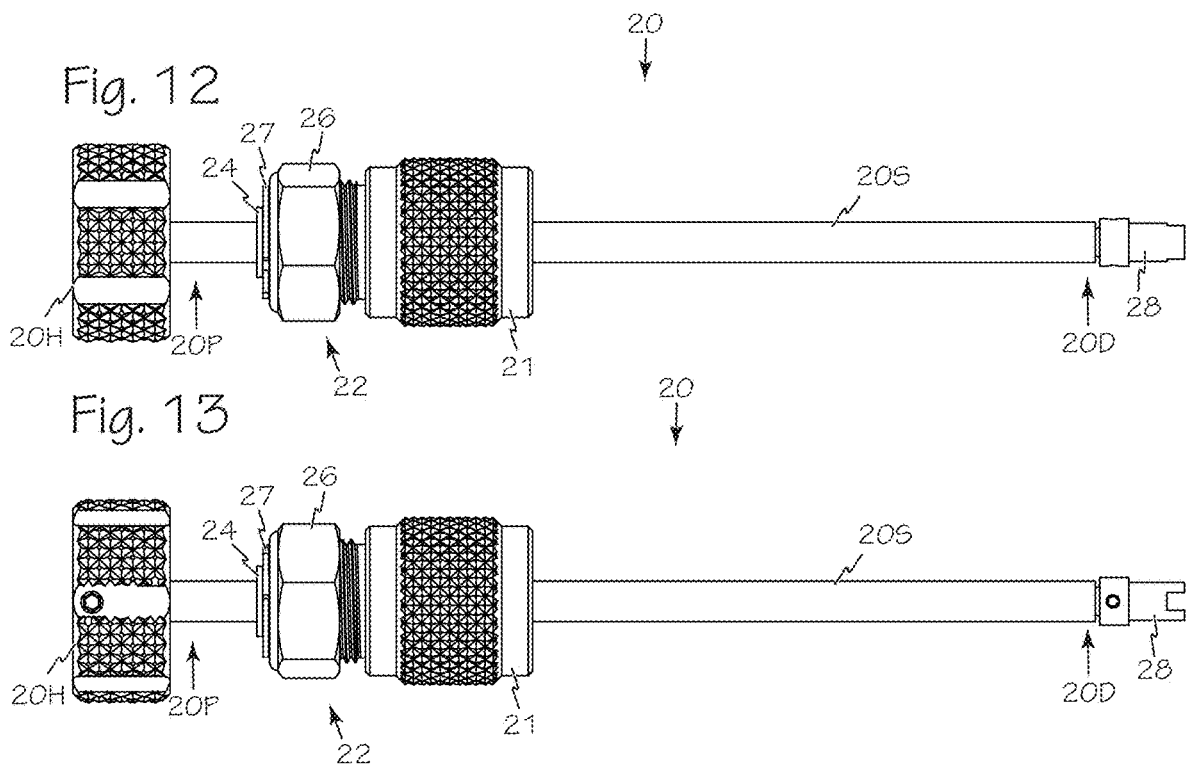
Fig. 12
Fig. 13
Fig. 14
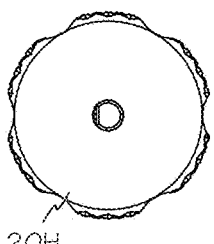
Fig. 15
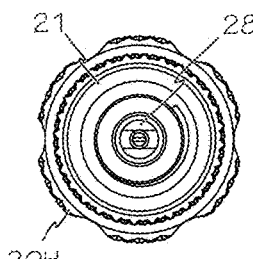

47

40

42

40B

43

48

53H

53R

52

40A

40

42

40B

40A

43

48

53H

53R

52

46

46

40A

53R

47

40B

53H

46

40A

47

42

40B

Fig. 27
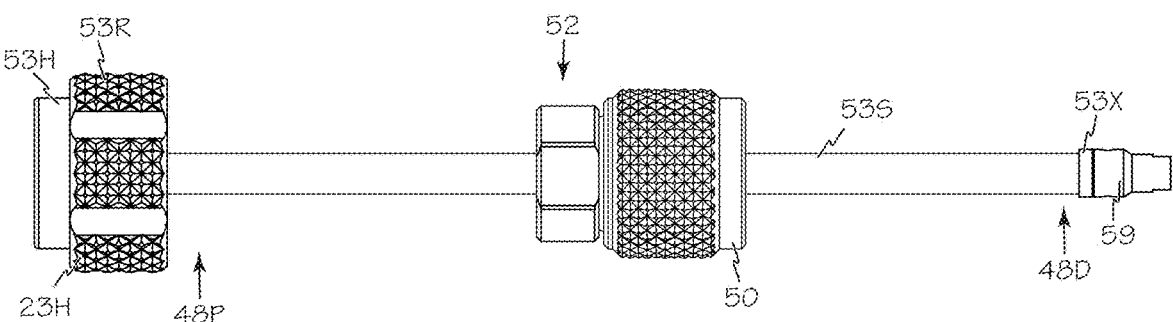
Fig. 28
Fig. 29
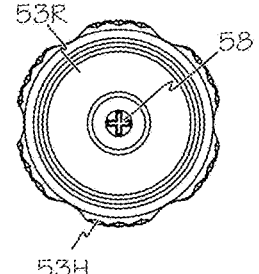
Fig. 30
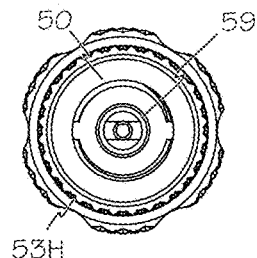

METHOD AND APPARATUS FOR VALVE CORE INSTALLATION/REMOVAL

This application is a continuation-in-part of U.S. application Ser. No. 18/507,977 filed Nov. 13, 2023, which is a continuation of U.S. application Ser. No. 18/093,712 filed Jan. 5, 2023.

FIELD OF THE INVENTIONS

The inventions described below relate to the field of heating, ventilation and air conditioning equipment.

BACKGROUND OF THE INVENTIONS

Conventional heating, ventilation, air conditioning and refrigeration (HVACR) Schrader® valves are a connector to allow refrigerant to be introduced into an HVACR system or removed from an HVACR system. (Schrader® is a registered trademark of Sensata Technologies, Inc.) The Schrader® valve core is centrally located in the valve and spring-biased to a closed position preventing refrigerant from escaping. When a mating connector is attached, a centrally located "core depressor" pushes the top pin of the core, compresses the biasing spring and causes the valve to open, allowing refrigerant flow.

Some conventional core depressors are hollow to allow refrigerant flow, and others have a flat blade that threads into the inside surface of a gasket. The Schrader® valve and the core depressor are a limitation to the flow of refrigerant. Additionally, Schrader® valves need to be replaced periodically to maintain system integrity.

SUMMARY

The devices and methods described below provide for a method and a dual-valve, valve core installation/removal tee for removal and or replacement of a valve core in an HVAC system flare fitting without evacuating the refrigeration system. The use of a dual-valve, valve core installation/removal tee also permits the valve core to be removed and maintenance of the HVAC system to be performed without the flow restriction of the valve core and core depressor. This device also allows servicing the HVAC system through the valve core installation/removal tee.

An alternate device and method provides a valve core installation/removal tee for the removal and or replacement of a valve core in an HVAC system flare fitting without evacuating the refrigeration system. This device also allows servicing the HVAC system through the valve core installation/removal tee. The alternate valve core installation/removal tee includes a preadjusted friction control assembly

BRIEF DESCRIPTION OF THE DRAWINGS

FIG. 1A is a perspective view of a prior art flare fitting with a Schrader® valve.

FIG. 1B is a perspective view of a prior art Schrader® valve core.

FIG. 2 is a perspective view of the dual-valve, valve core removal tee.

FIG. 3 is a top plan view of the dual-valve, valve core removal tee of FIG. 2.

FIG. 12 is a side view of the valve core removal arm of FIG. 11.

FIG. 13 is a top view of the valve core removal arm of FIG. 11.

FIG. 14 is a front end view of the valve core removal arm of FIG. 11.

FIG. 15 is a rear end view of the valve core removal arm of FIG. 11.

FIG. 27 is a side view of the valve core removal arm of FIG. 26.

FIG. 28 is a top view of the valve core removal arm of FIG. 26.

FIG. 29 is a front end view of the valve core removal arm of FIG. 26.

FIG. 30 is a rear end view of the valve core removal arm of FIG. 26.

DETAILED DESCRIPTION OF THE INVENTIONS

Figures 4, 5, 6, 7:
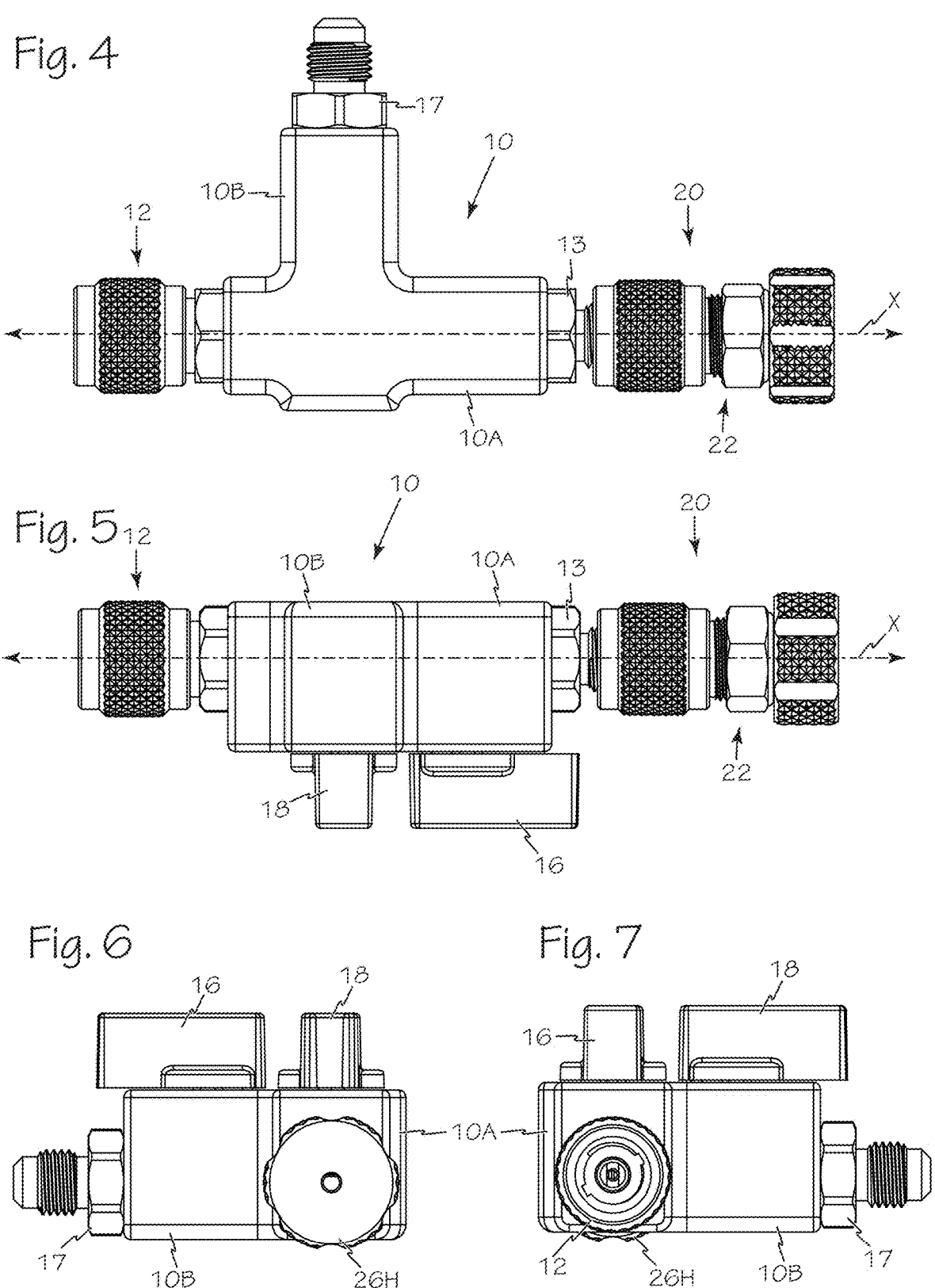
FIG. 4 is a bottom view of the dual-valve, valve core removal tee of FIG. 2.
FIG. 5 is a right side view of the dual-valve, valve core removal tee of FIG. 2.
FIG. 6 is a front end view of the dual-valve, valve core removal tee of FIG. 2.
FIG. 7 is a back end view of the dual-valve, valve core removal tee of FIG. 2.
Figure 8:
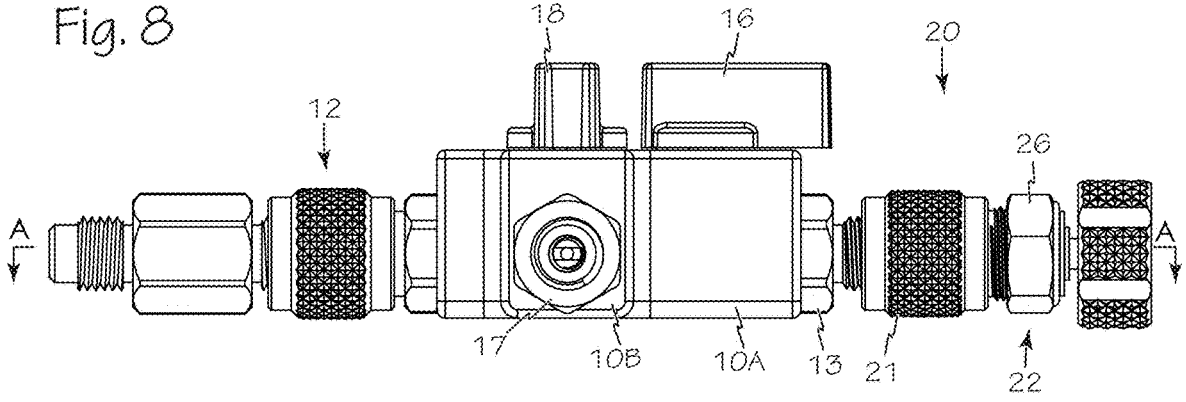
FIG. 8 is a is a left side view of the dual-valve, valve core removal tee of FIG. 2 engaging the flare fitting of FIG. 1.

FIG. 1A illustrates a prior-art flare fitting 1 equipped with a Schrader® valve 2. FIG. 1B illustrates the prior-art Schrader® valve core 3 of FIG. 1A exposing the valve core shoulders 3A which enable removal of the valve core from the Schrader® valve.

The dual-valve, valve core installation/removal tee 10 is illustrated in FIGS. 2 through 10. Dual-valve, valve core installation/removal tee 10 has a generally linear main body 10A with a longitudinal axis X colinear the main bore 11. Primary body 10A includes primary port 12 at a first end 10X of the main body and a secondary port 13 at the second end 10Y of the main body. A sight glass 14 between the primary port 12 and the secondary port 13 enables visibility into main bore 11. Primary valve 16 is oriented between the sight glass 14 and the secondary port 13 and is used to isolate secondary port 13 which is the valve core removal port from the primary port 12. In FIG. 3 primary valve 16 is illustrated in open position 16A and a dashed line illustration of the primary valve is shown in closed position 16C. A drain/fill or utility arm 10B attaches to primary body 10A perpendicular to the longitudinal axis X between the primary port 12 and the primary valve 16. Drain/fill arm 10B includes drain/fill port 17, secondary valve 18 and access bore 11B which puts drain/fill port 17 in fluid communication with primary bore 11. Secondary valve 18 enables closure of access bore 11B between drain/fill port 17 and primary bore 11. In FIG. 3 secondary valve 18 is illustrated in open position 18A and a dashed line illustration of the secondary valve is shown in closed position 18C.

Secondary or valve core removal port 13 is sized to accommodate the valve core installation/removal assembly 20. Valve core installation/removal assembly 20 is illustrate in FIGS. 10 through 15. Sight glass 14 permits a visual check of the removal and reinstallation of a valve core such as valve core 3 engaged on the distal end of the valve core removal assembly. Primary port 12 is sized to connect to the flare fitting 1 which is part of any suitable HVAC system. Primary valve 16 and secondary valve 18 are preferably ball valves, however, any suitable valve may be used.

Referring now to FIG. 10 through 15, valve core installation/removal assembly 20 includes attachment collar 21, with a friction control assembly 22. Friction control assembly 22 engages attachment collar 21 and provides friction control of the valve core installation/removal assembly 23 when the primary valve is opened and the bore is pressurized.

Figure 9:
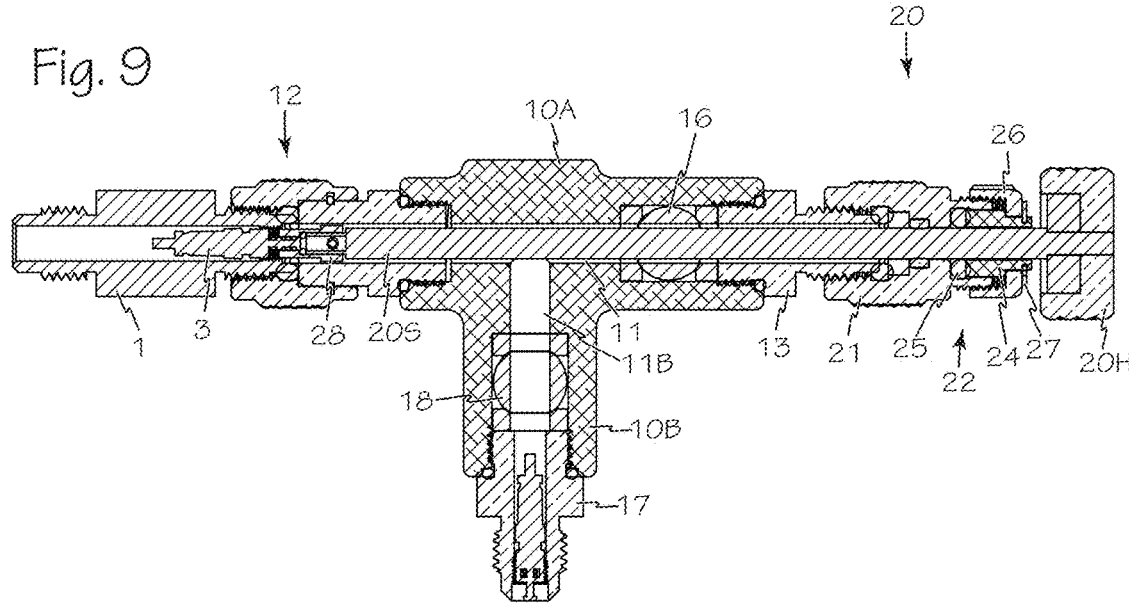
FIG. 9 is a cross-section view of the dual-valve, valve core removal tee and flare fitting of FIG. 8 taken along A-A.
Figure 10:
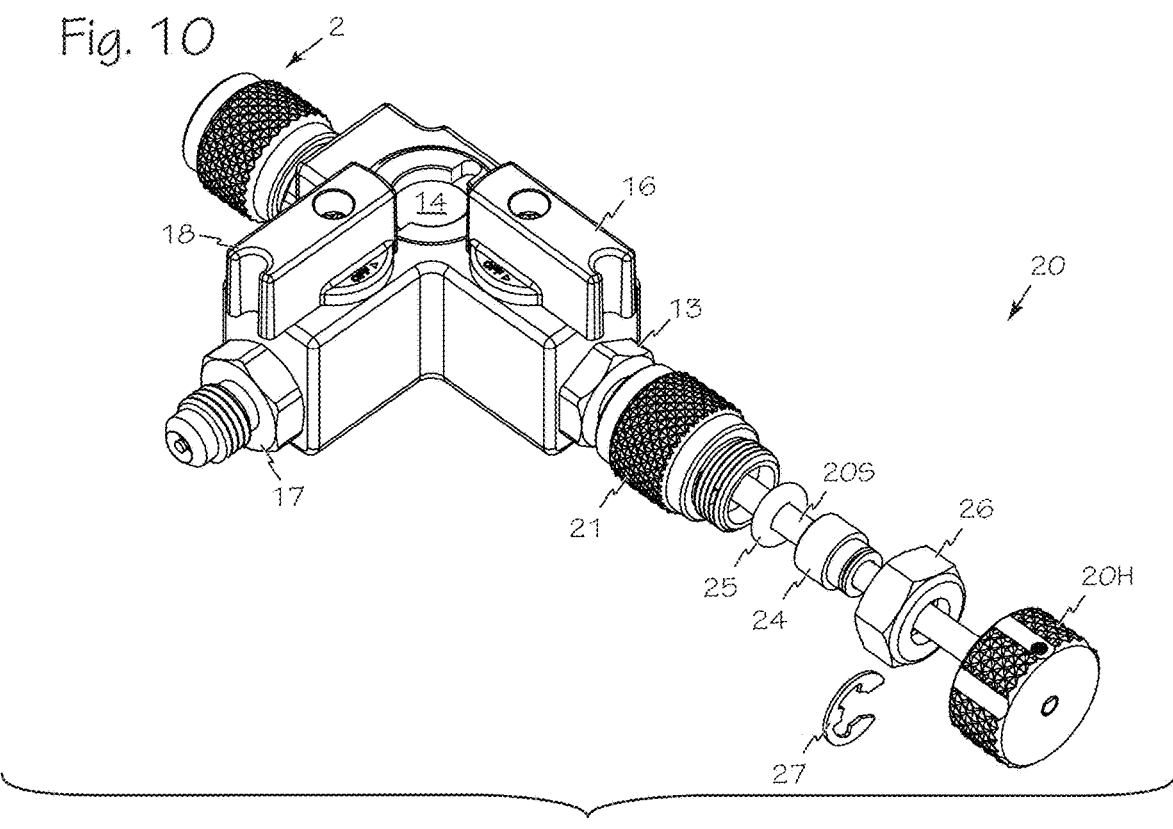
FIG. 10 is an exploded perspective view of the dual-valve, valve core removal tee of FIG. 2 with the components of the valve core removal arm exposed.
Figure 11:
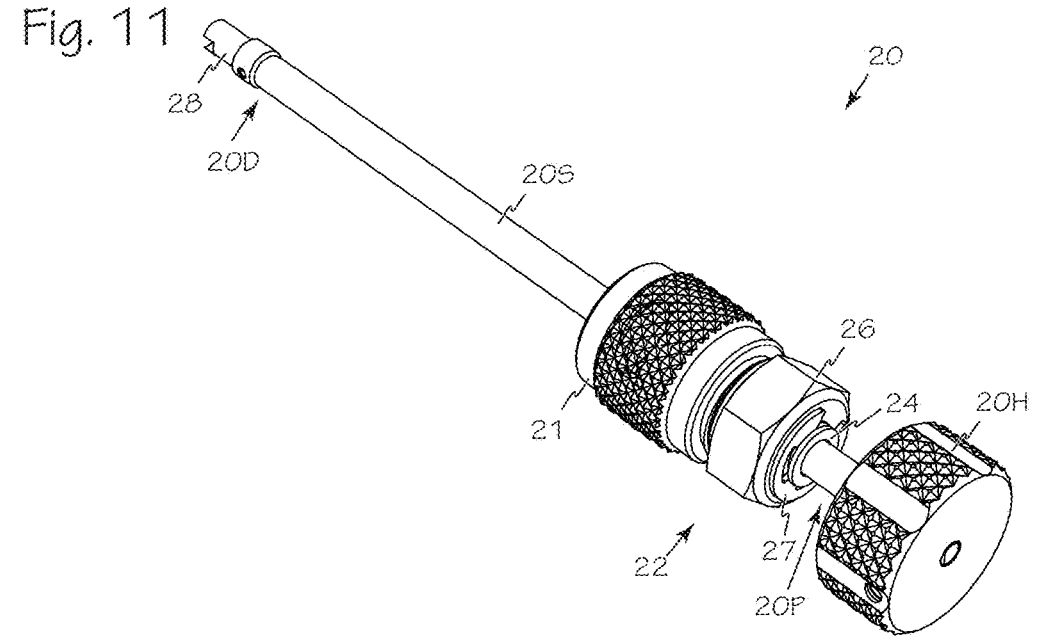
FIG. 11 is a top-right perspective view of a valve core removal arm.
Figure 16:
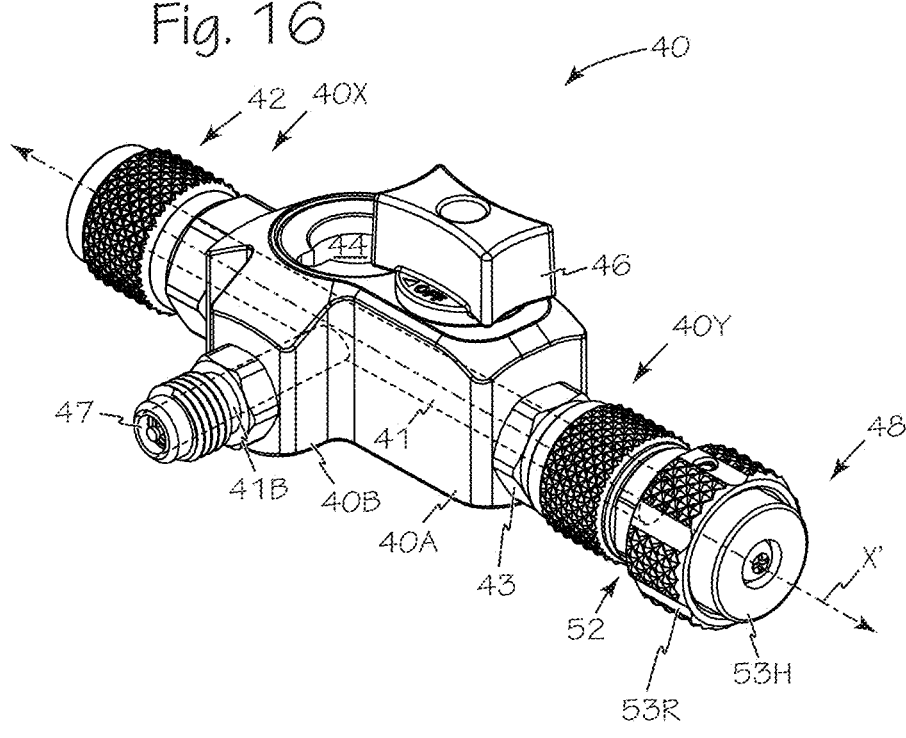
FIG. 16 is a perspective view of a valve core installation/removal tee.

Friction control assembly 22 includes friction control sleeve 24, O-ring 25, friction control cap 26 and lock ring 27. The friction control sleeve 24 is secured to the friction control cap 26 using lock ring 27 as illustrated in FIGS. 9 and 11. As illustrated in FIGS. 11, 12 and 13, the valve core installation/removal assembly 20 includes shaft 20S secured to magnetic handle 20H at the proximal end 20P of the shaft and valve core engagement tool 28 secured on the distal end 20D of the shaft 20S. Magnetic handle 20H enables the valve core installation/removal shaft to be magnetically secured to the housing of an HVAC system, or any other suitable ferrous surface, to keep the valve core installation/removal shaft and an engaged valve core clean and off the ground and or any surrounding surfaces during HVAC maintenance.

In use, to remove a Schrader® valve core from an HVAC flare fitting such as flare fitting 1 using a dual-valve, valve core installation/removal tee 10 the primary valve 16 is opened, open position 16A, and the secondary valve 18 is closed, closed position 18C, and the primary port of the dual-valve, valve core installation/removal tee 10 is secured to flare fitting 1.

The friction control cap 26 is adjusted to maintain sufficient friction on the valve core installation/removal shaft 20S to prevent the shaft from extending dangerously fast when Schrader® valve core 3 is removed from flare fitting 1 and the pressure of the refrigerant is released into dual-valve, valve core installation/removal tee 10. With the friction control cap adjusted, the valve core installation/removal shaft handle 23H is pushed into the dual-valve, valve core installation/removal tee 10 with slight rotation until the valve core engagement tool 28 engages shoulders 3A of the valve core. With the valve core engagement tool 28 engaging the valve core 3, the valve core installation/removal shaft handle 23H is rotated to disengage the valve core 3 from the flare fitting 1. When the valve core is disengaged from the flare fitting 1 the pressure of the refrigerant will apply pressure to the valve core installation/removal shaft 20S and the shaft will begin to extend out or away from the flare fitting. The valve core installation/removal shaft 20S should be held with the valve core engagement tool 28 visible in the sight glass 14 to confirm that the Schrader® valve core is engaged to the valve core engagement tool 28. With confirmation that the valve core is secured to the valve core engagement tool, the valve core installation/removal shaft 20S should be extended as far as possible away from the dual-valve, valve core installation/removal tee 10.

With the valve core installation/removal shaft 20S in the fully extended position, the primary valve 16 is rotated into closed position 16C. The attachment collar 21 is removed from the secondary port 13 and the valve core installation/removal assembly 20 with the attached valve core 3 is removed from the dual-valve, valve core installation/removal tee 10 and the magnetic handle 23H of the valve core installation/removal shaft may be removably secured to any metal surface in the vicinity of the flare fitting to keep the valve core clean during the system maintenance.

The HVAC system may them be maintained through the secondary port 13 and or the drain/fill port 17 with the assistance of the primary valve 16 and the secondary valve 18.

The previous process may be performed in reverse order to insert and new Schrader® valve core or to reinstall the previously removed valve core.

Figure 17:
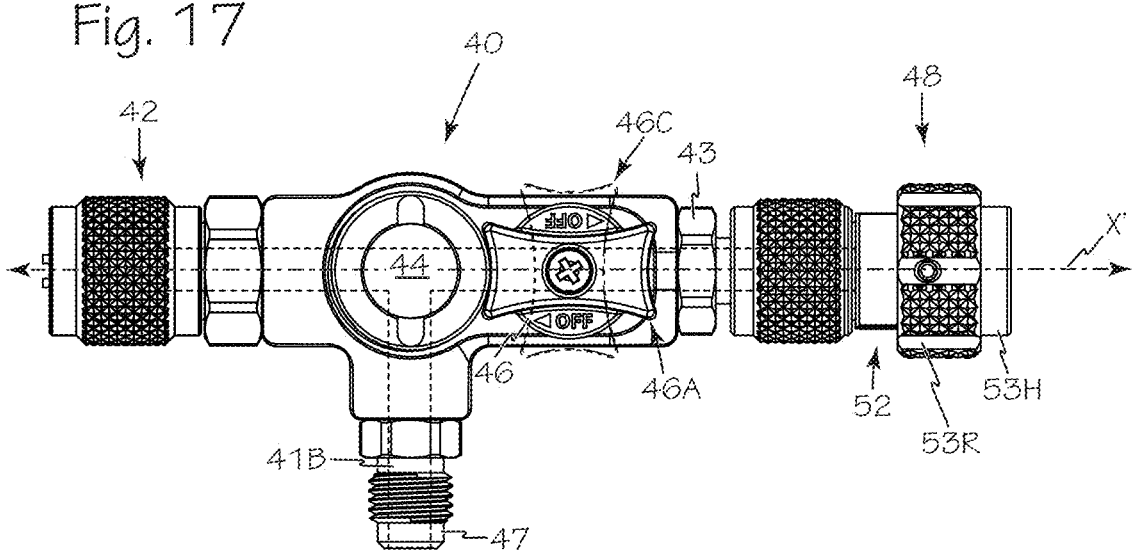
FIG. 17 is a top plan view of the valve core installation/removal tee of FIG. 16.
Figures 18, 19, 20, 21:
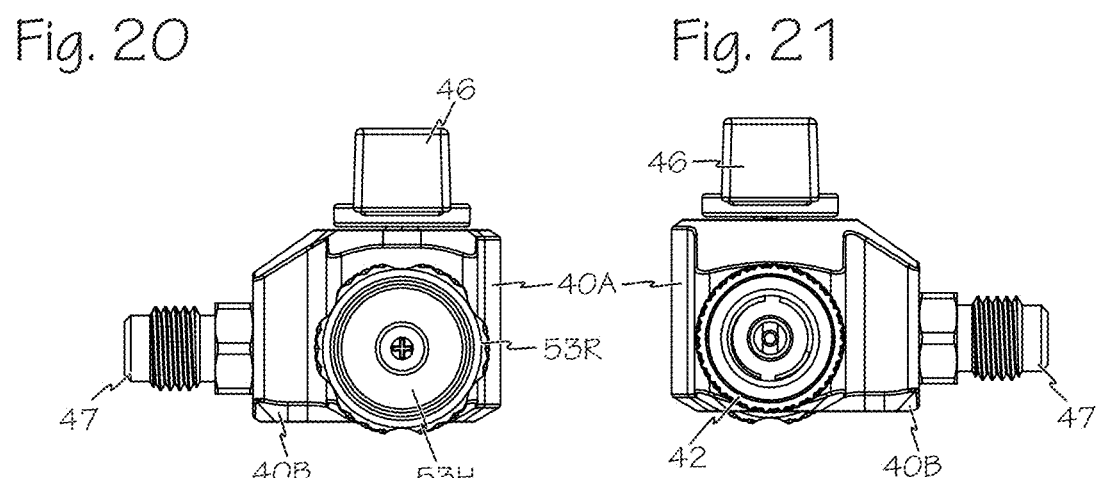
FIG. 18 is a bottom view of the valve core installation/removal tee of FIG. 16.
FIG. 19 is a right side view of the valve core installation/removal tee of FIG. 16.
FIG. 20 is a front end view of the valve core installation/removal tee of FIG. 16.
FIG. 21 is a back end view of the valve core installation/removal tee of FIG. 16.
Figure 22:
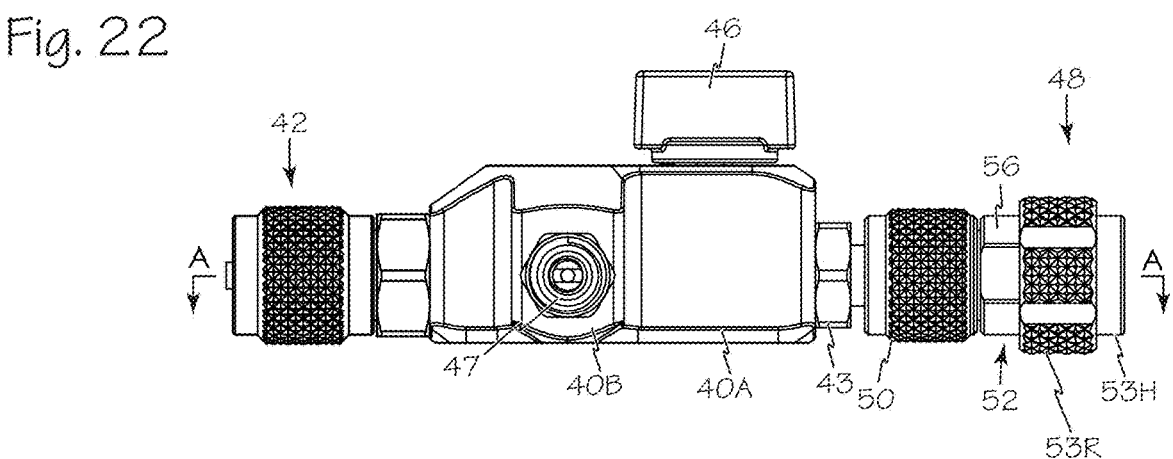
FIG. 22 is a is a left side view of the valve core installation/removal tee of FIG. 16.
Figure 23:
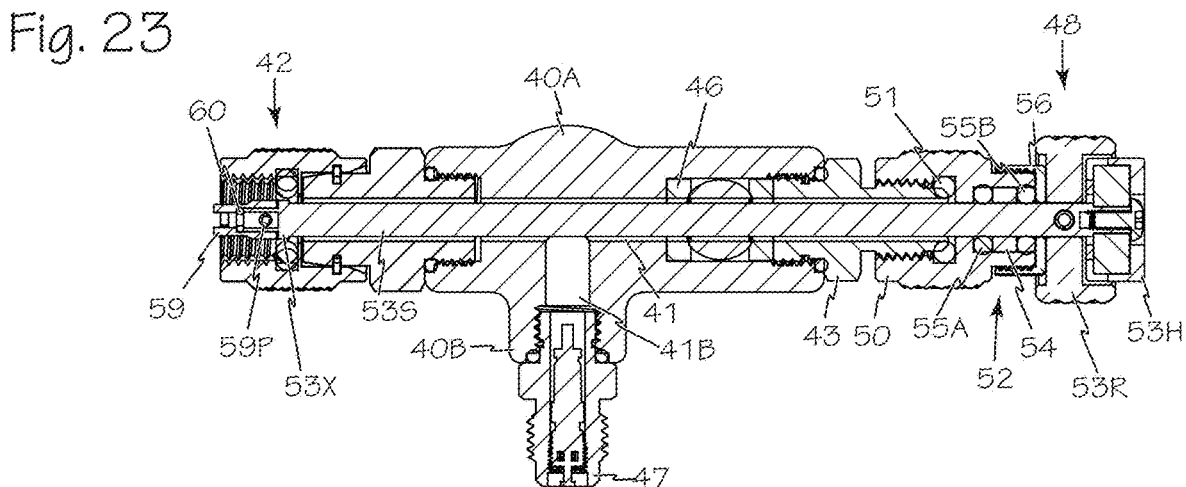
FIG. 23 is a cross-section view of the valve core installation/removal tee of FIG. 22 taken along A-A.
Figures 24, 25, 26:
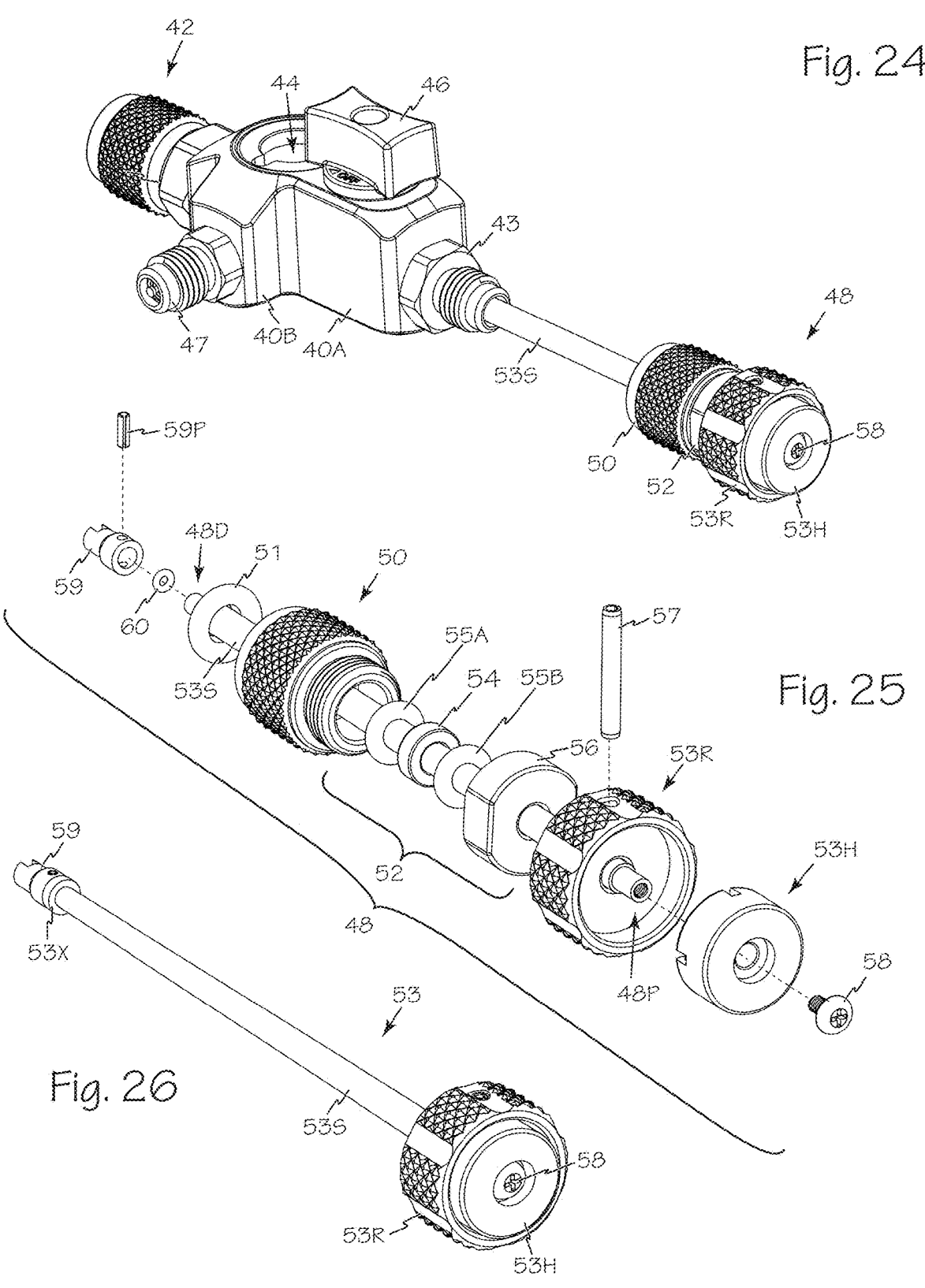
FIG. 24 is a perspective view of the valve core installation/removal tee of FIG. 16 with the valve core removal arm extended.
FIG. 25 is an exploded perspective view of the valve core removal arm, attachment collar and friction control components of FIG. 24.
FIG. 26 is a perspective view of the valve core removal arm of FIG. 25.

The valve core installation/removal tee 40 is illustrated in FIGS. 16 through 30. Valve core installation/removal tee 40 has a generally linear main body 40A with a longitudinal axis X' colinear with the main bore 41. Primary body 40A includes primary port 42 at a first end 40X of the main body and a secondary port 43 at the second end 40Y of the main body. A sight glass 44 between the primary port 42 and the secondary port 43 enables visibility into main bore 41. Primary valve 46 is oriented between the sight glass 44 and the secondary port 43 and is used to isolate secondary port 43, which is the valve core removal port, from the primary port 42. In FIG. 17 primary valve 46 is illustrated in open position 46A and a dashed line illustration of the primary valve is shown in closed position 46C. A drain/fill or utility arm 40B attaches to primary body 40A perpendicular to the longitudinal axis X' between the primary port 42 and the primary valve 46. Drain/fill arm 40B includes drain/fill port 47 and access bore 41B which puts drain/fill port 47 in fluid communication with primary bore 41.

Secondary or valve core removal port 43 is sized to accommodate the valve core installation/removal assembly 48. Valve core installation/removal assembly 48 is illustrate in FIGS. 24 through 28. Sight glass 44 permits a visual check of the removal and reinstallation of a valve core such as valve core 3 engaged on the distal end of the valve core removal assembly. Primary port 42 is sized to connect to the flare fitting 1 which is part of any suitable HVAC system. Primary valve 46 is preferably a ball valve, however, any suitable valve may be used.

Referring now to FIG. 25 through 30, valve core installation/removal assembly 48 includes attachment collar 50, main seal 51 with a friction control stabilizer 52, and valve core installation/removal subassembly 53. Friction control stabilizer 52 includes compression spacer 54, first and second O-rings 55A and 55B and friction control cap 56. Friction control stabilizer 52 engages attachment collar 50 and provides factory-set friction control of the valve core installation/removal subassembly 53 when the valve core seal is broken and the bore is pressurized. Additionally, first and second O-rings 55A and 55B provide two separate points of contact with shaft 53S keeping shaft 53S concentric in the main bore 41 as well as secondary port 43.

As illustrated in FIGS. 25, 26, 27 and 28, the valve core installation/removal subassembly 53 includes control rod or shaft 53S having a distal end 53D and a proximal end 53P. Control shaft 53S includes a safety shoulder 53X to stop uncontrolled movement of the control shaft or rod 53S and prevent damage to valve core engagement tool 59 due to uncontrolled movement of the control shaft or rod 53S. Control rod handle 53R is secured adjacent proximal end 48P with a pin 57. Magnetic spinner 53H is secured to the proximal end 53P of the shaft 53S with screw 58 in a manner that permits magnetic spinner 53H to spin freely about screw 58 and proximal end 53P. This ability of spinner 53H to spin decouples a user's control of valve core installation/removal subassembly 53 and controlling the thrust of pressure exerted on subassembly 53 through the spinner 53H. This permits optimum "feel" of the valve core through control rod handle 48R. Valve core engagement tool 59 and compression ring 60 are secured on the distal end 48D of the shaft 48S with a pin 59P although any suitable attachment may be used. Magnetic handle 23H enables the valve core installation/removal shaft to be magnetically secured to the housing of an HVAC system, or any other suitable ferrous surface, to keep the valve core installation/removal shaft and an engaged valve core clean and off the ground and or any surrounding surfaces during HVAC maintenance.

In use, the primary port 42 of valve core installation/removal tee 40 is connected to any suitable service port containing the valve to be removed. Then valve core installation/removal subassembly 53 is pushed into the valve core installation/removal tee 40 until the valve core engagement tool 59 encounters the valve core 3. Next, while pushing the spinner with one hand, use the other hand to rotate the valve core installation/removal subassembly 53 by the handle 53R until the valve core engagement tool 59 engages the shoulder 3A of valve core 3 and engages it. Engagement is certain when an increase in resistance is felt in handle 53R. Then rotate the valve core installation/removal subassembly 53 counterclockwise to unscrew the valve core 3. The valve seal will break before the valve is fully unscrewed thus, it is necessary to maintain pressure toward the valve with the spinner while unscrewing until a lack of rotational resistance and travel is felt indicating valve core 3 is unscrewed. Next, in a controlled manner, ease up the pressure on spinner 53H enough to allow the system pressure to push the valve core installation/removal subassembly 53 and valve core 3 out until it stops. Use the sight glass 44 to verify valve core 3 is captured. With the valve core installation/removal subassembly 53 fully extended, close the primary valve 46 to seal the HVAC system pressure. Keeping valve core installation/removal tee 40 connected to the HVAC system via primary port 42, unscrew attachment collar 50 from secondary port 43 and remove valve core installation/removal subassembly 53 and valve core 3. The valve core installation/removal subassembly 53 and valve core 3 may be removably secured to any metal surface in the vicinity of the flare fitting using magnetic spinner 53H to keep the valve core clean during the system maintenance.

The HVAC system may them be maintained through the secondary port 43 and or the drain/fill port 47 with the assistance of the primary valve 46.

The previous process may be performed in reverse order to insert and new Schrader® valve core or to reinstall the previously removed valve core.

Install valve core 3 or a new replacement in the reverse order it was removed.

While the preferred embodiments of the devices and methods have been described in reference to the environment in which they were developed, they are merely illustrative of the principles of the inventions. The elements of the various embodiments may be incorporated into each of the other species to obtain the benefits of those elements in combination with such other species, and the various beneficial features may be employed in embodiments alone or in combination with each other. Other embodiments and configurations may be devised without departing from the spirit of the inventions and the scope of the appended claims.

We claim:

1. A valve core installation/removal tee comprising:

a generally linear body with a primary port at a first end and a secondary port at a second end of the generally linear body, a bore in fluid communication between the primary port and the secondary port, the generally linear body including a sight glass between the primary port and the secondary port configured to provide a view into the bore and a primary valve between the sight glass and the secondary port, the primary valve configured to isolate the secondary port from the primary port;

a utility arm configured to extend from the generally linear body perpendicular to the generally linear body, the utility arm includes a utility port in fluid communication with the bore; and a valve core installation/removal assembly with an attachment collar sized to engage the secondary port, a valve core installation/removal shaft having a handle with a magnetic spinner at a first end and a safety shoulder with a valve core engagement tool at a second end, the valve core engagement tool and the valve core installation/removal shaft sized to move through the primary and secondary ports, the primary valve and the bore, the valve core installation/removal assembly including a friction control stabilizer with a compression spacer and first and second O-rings and a friction control cap to control the movement of the valve core installation/removal shaft through the secondary port.

2. A valve core installation/removal tee comprising:

a generally linear body with a primary port at a first end and a secondary port at a second end in fluid communication via a bore between the primary port and the secondary port, the generally linear body including a sight glass configured to provide a view into the bore and an isolation ball valve between the sight glass and the secondary port, the isolation ball valve configured to isolate the secondary port from the primary port;

a utility arm configured to extend perpendicular from the generally linear body, the utility arm having a utility port in fluid communication with the bore; and a valve core installation/removal assembly having a handle and a valve core installation/removal shaft with a safety shoulder and a friction control stabilizer configured to control the movement of the valve core installation/removal shaft through the secondary port;

wherein the friction control stabilizer further comprises:

an attachment collar sized to engage the secondary port;

a first O-ring;

a compression spacer;

a second O-ring; and a friction control cap wherein the valve core installation/removal shaft further comprises a magnetic spinner; and a valve core engagement tool secured to the valve core installation/removal shaft.

3. A valve core installation/removal tee comprising:

a T-shaped body having a primary port, a secondary port and a utility port all in fluid communication through a bore;

a sight glass in the T-shaped body configured to provide visibility into the bore between the primary port and the secondary port;

a primary valve configured to isolate the bore from the secondary port;

a secondary valve configured to isolate the bore from the utility port; and a valve core installation/removal assembly configured to extend through the primary valve from the secondary port through the primary port, the valve core installation/removal assembly further including a friction control stabilizer, wherein the friction control stabilizer further comprises an attachment collar sized to engage the secondary port.

4. The valve core installation/removal tee of claim 3 wherein the valve core installation/removal assembly further comprises a valve core installation/removal shaft with a magnetic spinner.

5. The valve core installation/removal tee of claim 4 wherein the valve core installation/removal assembly further comprises a valve core engagement tool secured to the valve core installation/removal shaft.

6. The valve core installation/removal tee of claim 4 wherein the valve core installation/removal assembly further comprises a safety shoulder on the valve core installation/removal shaft.

7. The valve core installation/removal tee of claim 4 wherein the friction control assembly further comprises:

a first O-ring;

a compression spacer;

a second O-ring; and a friction control cap.

\* \* \* \* \*